Aug. 16, 1966  R. C. WEBB  3,267,373
RESONANCE BRIDGE OR FREQUENCY DISCRIMINATOR
CIRCUIT AND SENSING SYSTEM
Filed July 19, 1963  5 Sheets-Sheet 1

INVENTOR.
RICHARD C. WEBB
BY
Sheridan and Ross
ATTORNEYS

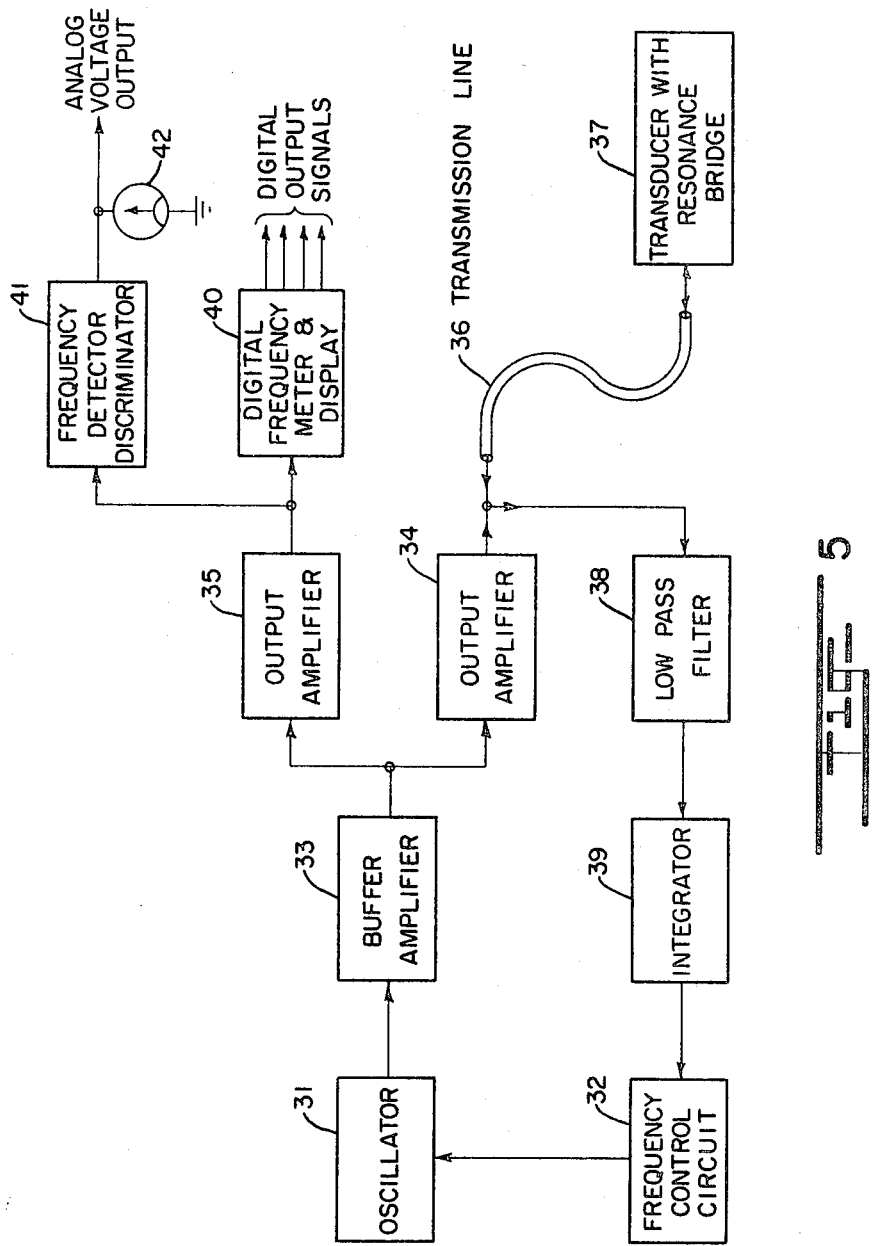

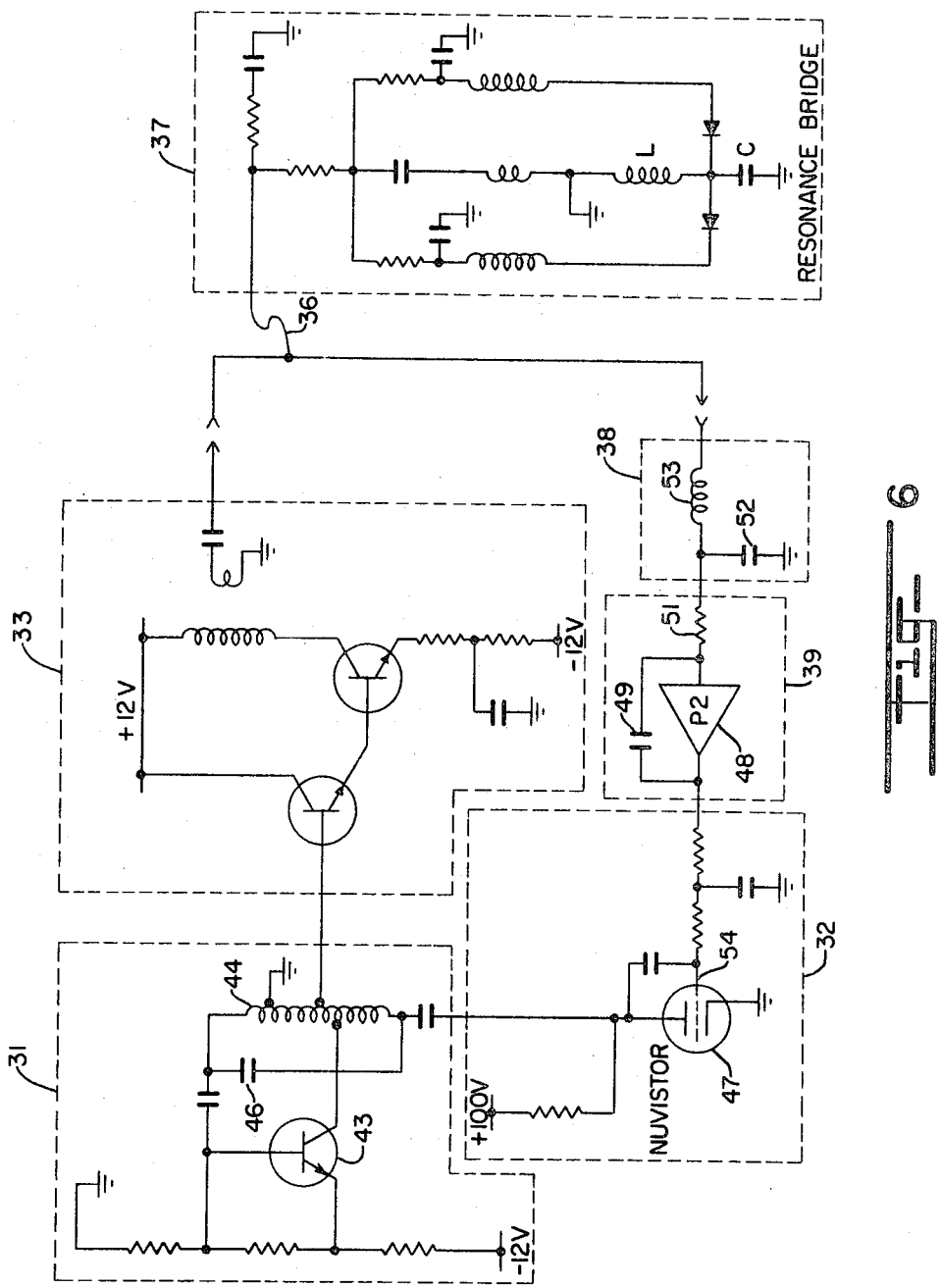

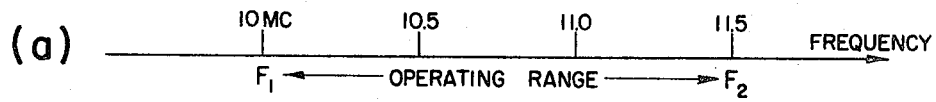

(a) — OPERATING RANGE — 10 MC, 10.5, 11.0, 11.5 FREQUENCY; $F_1$, $F_2$

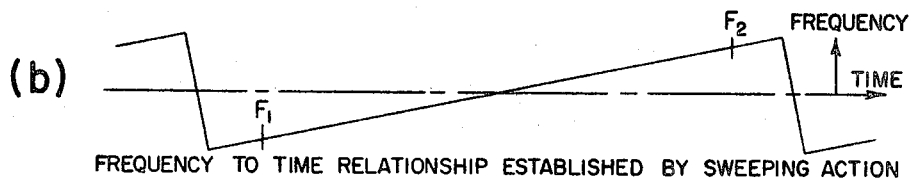

(b) FREQUENCY TO TIME RELATIONSHIP ESTABLISHED BY SWEEPING ACTION

(c) POSITION OF REFERENCE FREQUENCY, 10 MC

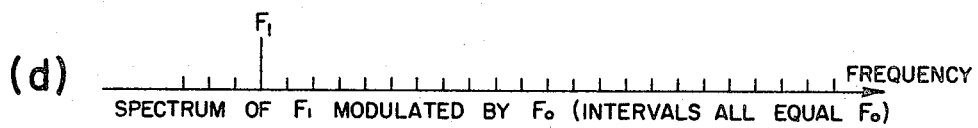

(d) SPECTRUM OF $F_1$ MODULATED BY $F_0$ (INTERVALS ALL EQUAL $F_0$)

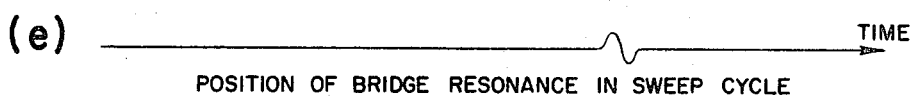

(e) POSITION OF BRIDGE RESONANCE IN SWEEP CYCLE

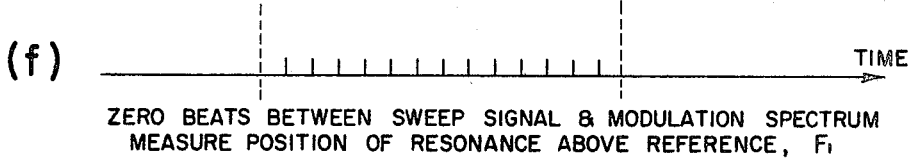

(f) ZERO BEATS BETWEEN SWEEP SIGNAL & MODULATION SPECTRUM MEASURE POSITION OF RESONANCE ABOVE REFERENCE, $F_1$

Fig. 7

INVENTOR.
RICHARD C. WEBB
BY
Sheridan and Ross
ATTORNEYS

United States Patent Office

3,267,373
Patented August 16, 1966

3,267,373
RESONANCE BRIDGE OR FREQUENCY DISCRIMINATOR CIRCUIT AND SENSING SYSTEM
Richard C. Webb, Broomfield, Colo., assignor to Colorado Instruments, Inc., Broomfield, Colo., a corporation of Colorado
Filed July 19, 1963, Ser. No. 296,328
8 Claims. (Cl. 324—81)

This invention relates to an electrical network or resonance bridge of the frequency discrimination type and a system for determining mechanical displacements, pressure, acceleration, temperature, etc., with an electromechanical transducer employing a resonance bridge.

The electrical network of this invention is called a resonance bridge because it operates to make the independent variable of frequency measurable in terms of conditions which determine a null point in the output signal delivered by the network. This network is useful as a transducer element because the frequency-determining portion of the bridge readily can be made to follow variations in some external property or effect, which render the effect measurable in terms of frequency. Many applications of this network are available in the field of remote sensing of micro-movements, pressure, acceleration, temperature, etc. Used as a transducer, the resonance bridge transforms the phenomena or property being measured into the frequency domain, wherein the skills for measurement in both analog and digital forms are very highly developed.

The resonance bridge is an inactive network in that it contains no active elements such as vacuum tubes, transistors, or other amplifying components requiring external sources of power. Furthermore, the resonance bridge provides a means of termination for a transmission line in its own characteristic impedance because the bridge can be designed to provide a pure resistive termination for a transmission line of any impedance level throughout a broad range of operating frequencies. In addition, the resonance bridge provides a means for making bi-directional use of the transmission line. Thus a single transmission line, preferably a coaxial line, becomes the sole means of connection between a transducer element employing the resonance bridge and the readout station. This interconnecting transmission line has no critical length restrictions and remote measurements of external effects can be made with a high degree of accuracy and precision.

Accordingly, it is an important object of this invention to provide an electrical network or resonance bridge which is uniquely adapted for use as a transducer element having a frequency-determining circuit which is highly suited to follow variations in properties, effects or phenomena measurable in terms of frequency.

Another object of this invention is to provide a system for sensing electromechanical effects and other phenomena or properties, in which system a tracking oscillator is combined with an electromechanical transducer employing a resonance bridge sensory element.

A further object of this invention is to provide a system, including a companion readout system, for the remote determination in digital form of external effects, phenomena or properties by combining a sweeping oscillator with an electromechanical transducer involving a radio frequency tuned resonance bridge as its sensory element.

Additional objects of this invention will become apparent from the following description, which is given primarily for purposes of illustration, and not limitation.

Stated in general terms, the objects of this invention are attained by providing a resonance bridge circuit or frequency discriminator adapted for use as an electromechanical transducer medium, and in combination therewith, a readout system employing an oscillator, such as a tracking oscillator or a sweeping oscillator.

The resonance bridge of this invention includes a frequency detecting network or frequency discriminator circuit, preferably connected to a compensation network, which in turn, preferably is connected to a transmission line, which preferably is a coaxial line, extending from a readout station to the compensation network and frequency network combination. The compensation network serves to make the composite assembly, throughout the range of operating frequencies, appear as a pure resistive termination for a transmission line.

The frequency detecting network, or resonance bridge, comprises a transformer primary inductance coil and two tightly coupled transformer secondary coils having an equal number of turns, wound in one direction on one secondary coil and in the opposite direction on the other secondary coil. The transformer primary coil constitutes the principal portion of the equivalent inductance of the frequency detecting network. Identical damping resistors are shunted across the respective transformer secondary coils to broaden and destroy any self resonant effects in the coils. A tuning circuit inductance coil is loosely coupled to the transformer primary inductance coil through a magnetic coupling. The tuning inductor, in turn, is connected to a tuning capacitance, which preferably includes parallel and series-parallel combinations of capacitors for use as sensory elements or as calibration elements. The tuning capacitance preferably is connected in parallel with the tuning inductance. Storage capacitors are connected respectively to the transformer secondary coils. Voltage rectifiers, preferably diodes, also are connected respectively to the transformer secondary coils to serve as peak voltage rectifiers. These rectifiers produce direct current voltages across the storage capacitors, which voltages are proportional to the sum of the alternating current voltages across the transformer secondary coils, together with the voltage across the parallel resonant circuit, including the tuning inductance and the tuning capacitance.

The voltages developed across the storage capacitors are made to be of opposite polarity by proper arrangement of the rectifier or diode polarities. When the resonance bridge is adjusted to be in balance, the voltages across the storage capacitors are of equal, but opposite magnitude. Identical resistors also are connected respectively to the transformer secondary coils to serve as voltage summing resistors. These resistors form a path for the net voltage output from the frequency discriminator circuit to reach the transmission line, and thus be fed back over the line to the readout station.

The compensation, or corrective network includes a resistor connected to the identical resistors of the frequency discriminator circuit. The respective values of these identical, voltage summing resistors preferably are very large compared to the value of the compensation network resistor. Also, it is important that the frequency discriminator circuit appear as an inductance whose value preferably is such as to make its impedance about 10 percent, or less, of the value of the impedance of the compensation network resistor.

The compensation network also includes a second resistor connected to the first mentioned resistor, preferably having a resistance equal to that of the first mentioned resistor, and connected to a capacitor connected to ground. The series parallel combination of the second mentioned resistor in series with the capacitor, and the first mentioned resistor in series with the frequency discriminator circuit equivalent inductance, comprise the termination impedance of the transmission line. The resulting parallel connection of capacitance and inductance with series resistance in each arm is anti-resonant at all frequencies when the two resistance elements are equal and related to the reactive elements as follows:

$R$ — First resistance = Second resistance =

$$\sqrt{\frac{\text{Equivalent inductance}}{\text{Capacitance}}}$$

Critical damping is reached in the resulting RLC circuit when the total resistance R in the loop becomes, $$R = 2\sqrt{\frac{L}{C}}$$

At this point, the circuit is seen to be fully damped. It will be seen that the resulting RLC circuit is capable of terminating a transmission line properly as a pure resistance load.

The combination of the resulting RLC circuit, as an electromechanical transducer medium, for example, with a readout system employing an oscillator, such as a tracking oscillator, or a sweeping oscillator, is described in detail hereinbelow with reference to the accompanying drawings. More detailed descriptions of the frequency discriminator circuit and the compensation network also are given below with reference to the accompanying drawings, wherein:

FIG. 5 is a block diagram schematically showing the relationship of the logical circuit elements included in a specific embodiment of the tracking oscillator system of this invention;

FIG. 6 is a schematic circuit diagram showing a specific embodiment of a circuit of a tracking oscillator and loop closed through a resonance bridge;

FIGS. 7a to 7f are a series of resonance detector timing diagrams; and

Figure 1:
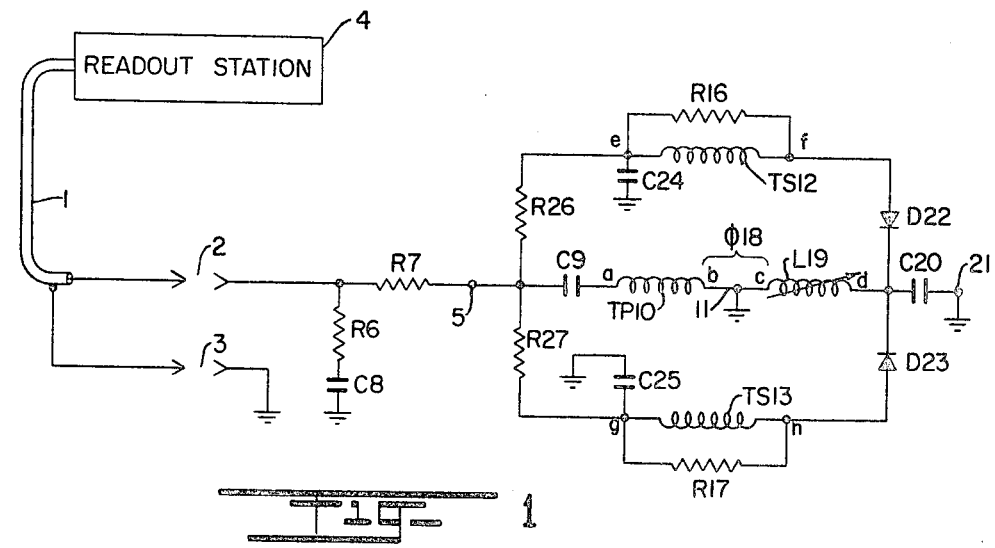
FIG. 1 is a schematic circuit diagram showing the frequency discriminator circuit, the compensation network, and the transmission line connected to a readout station.

The basic circuit of the resonance bridge is shown in FIGURE 1, wherein 1 represents a transmission line, preferably coaxial, extending from the readout station 4, out to the location of the effect being measured with use of the resonance bridge. Transmission media are indicated at 2 and 3.

That portion of the circuit lying to the right of terminal 5 constitutes the frequency detecting network. That portion of the circuit lying to the left of terminal 5 and consisting of resistors R6, R7, and capacitor C8 is a compensation network which serves to make the composite assembly appear as a pure resistive termination for a transmission line throughout the range of operating frequencies.

Figure 2:
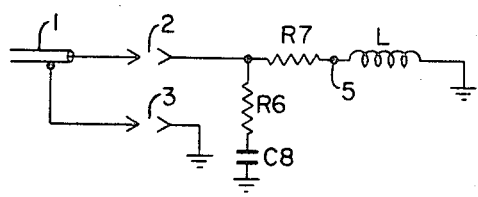
FIG. 2 is a similar partial diagram showing the equivalent inductance of the frequency discriminator circuit connected to the compensation network, which is connected to the end of the transmission line.

The corrective network is analyzed in FIGURE 2, wherein that portion of the circuit in FIGURE 1 which lies to the right of terminal 5 is symbolized as a simple inductance L. The series parallel combination of R6 in series with C8 and R7 in series with L comprise the termination impedance seen by transmission line 1.

Many basic electrical engineering textbooks have shown and analyzed this parallel connection of capacitance and inductance with series resistance in each arm. It is well known, moreover, that such a circuit is anti-resonant at all frequencies when the unique condition is satisfied that the two resistance elements are equal and related to the reactive elements as follows:

$$R6 = R7 = \sqrt{\frac{L}{C8}}$$

Furthermore, in this case the impedance $Z_i$ looking into the series parallel assembly is found to be:

$$Z_i = \sqrt{\frac{L}{C8}} + j0 \text{ ohms}$$

In addition to the above, it is also known that critical damping is reached in the RLC circuit when the total resistance in the loop becomes $$R = 2\sqrt{\frac{L}{C8}}$$

Hence, the circuit is seen to be completely aperiodic, or fully damped, when so proportioned. Thus, it is capable of terminating a transmission line properly as a pure resistance load.

Referring again to FIGURE 1, it is necessary that the frequency sensing network to the right of terminal 5 appear as an inductance whose value preferably is such as to make its impedance ten percent or less of the value of R7 throughout the frequency range of operation to be employed. Capacitor C9 serves only as a D.C. blocking capacitor and is chosen to have a negligible impedance.

Transformer primary TP10 is an inductance coil connecting to ground at terminal 11. This coil comprises the principal portion of the equivalent inductance L, shown to the right of terminal 5 in FIGURE 2. Tightly coupled to transformer primary TP10 are transformer secondaries TS12 and TS13. These two windings have the same number of turns, but one of them is oppositely wound. They are portioned to have as many turns on them as possible, while at the same time keeping their self-resonance slightly above the highest frequency to be employed in the operating range of the bridge.

Identical damping resistors R16 and R17 of a few thousand ohms are shunted across the transformer secondary windings TS12 and TS13, respectively, to broaden and destroy any self-resonant effects in the coils. Very loosely coupled to primary coil TP10 through magnetic coupling $\phi$ 18 is the tuned circuit inductance L19.

One side of tuning inductor L19 is connected to ground terminal 11, while the other side connects to adjustable capacitance C20, which may, of course, be made up of parallel and series-parallel combinations of capacitors which may be used as sensory elements or as calibration elements. Note that one side of tuning capacitance C20 is grounded at terminal 21, thereby placing it in parallel with L19.

Diodes D22 and D23 serve as peak voltage rectifiers, producing D.C. voltages across storage capacitors C24 and C25 proportional to the sum of the A.C. voltages across transformer secondaries TS12 and TS13, together with the voltage across the parallel resonant circuit comprising L19 and C20.

The voltages developed across C24 and C25 are arranged to be of opposite polarity by choice of diode polarization; and when the bridge is at balance, these voltages are of equal magnitude. Identical resistors R26 and R27, of a very large value compared to resistor R7, serve as voltage-summing resistors and form a path for the net voltage output from the frequency discriminator circuit to reach the transmission line and thus be fed back over the line to the readout station.

Figure 3A:
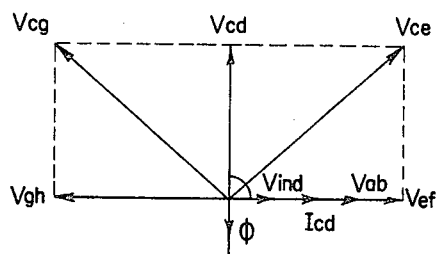
FIG. 3A is a vector diagram showing the condition within the frequency discriminator circuit when the applied frequency is equal to the resonant frequency of the tuned circuit.
Figure 3B:
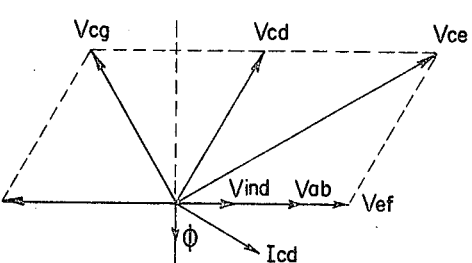
FIG. 3B is a vector diagram showing the condition within the frequency discriminator circuit when the applied frequency is above the resonant frequency of the tuned circuit.

A vector diagram explaining conditions within the frequency discriminator circuit is shown in FIGURES 3A and 3B.

FIGURE 3A shows the condition when the applied frequency is equal to the resonant frequency of the tuned circuit. Let $V_{ab}$ represent the vector voltage reaching the transformer primary TP10. The current flowing in this transformer primary, $I_{ab}$, lags the applied voltage by 90 electrical degrees, as shown in the diagram; and the magnetic flux field $\phi$ will be in phase with $I_{ab}$ as indicated.

The flux field $\phi$ is weakly coupled to the inductance of the tuned circuit L19 and produces an induced voltage $V_{ind}$ in coil L19, leading the flux by 90 degrees, as indicated. The current flowing in the resonant circuit $I_{cd}$ as a result of the induced voltage will, in the case of resonance, be directly in phase with $V_{ind}$ since the tuned circuit will then appear as a resistive load on $V_{ind}$.

In the case when the applied frequency is above the resonant frequency of the tuned circuit, as indicated in FIGURE 3B, however, the tuned circuit appears as an inductive load on $V_{ind}$ and therefore takes a lagging current $I_{cd}$ as shown.

In either case, the voltage across the coil L19, which is $V_{cd}$, always leads the current flowing in the coil by 90 degrees; hence, in the off-resonant condition shown in FIGURE 3B, voltage $V_{cd}$ lags the position occupied previously in FIGURE 3A.

Thus we see that the voltage $V_{cd}$ may occupy the symmetrical position as shown in FIGURE 3A, or it may lag that position when the applied frequency is above the resonant frequency of the tuned circuit, as in FIGURE 3B. Similarly, it may lead by a like amount whenever the applied frequency lies below the resonant frequency of the tuned circuit.

The voltages developed across the two transformer secondaries TS12 and TS13—namely, $V_{ef}$ and $V_{gh}$, respectively—are produced by a very tight magnetic flux coupling between the primary and secondary windings. Moreover, the direction of winding of the coil comprising transformer secondary TS13 is arranged to be opposite to the direction of winding of the coil comprising transformer secondary TS12. Therefore, the voltage $V_{gh}$ is 180 degrees out of phase with respect to the voltage $V_{ef}$. For this reason, the vector voltage sums, $V_{ce}$ and $V_{cg}$, are as shown in FIGURES 3A and 3B, and vary in magnitude in accordance with the applied frequency, which in the case of FIGURE 3B causes $V_{ce}$ to increase, while $V_{cg}$ decreases.

Figure 4:
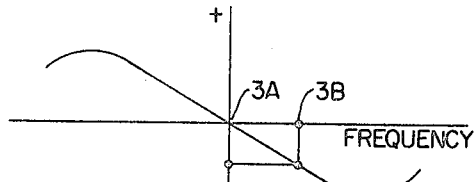
FIG. 4 is a graph which shows the locus of the output voltage as a function of the frequency of the frequency discriminator circuit.

By rectifying the two voltages represented by vectors $V_{ce}$ and $V_{cg}$ by means of diodes D22 and D23, oppositely polarized, the resulting D.C. voltages established across storage capacitors C24 and C25, are also oppositely polarized so that when the circuit is at resonance as in FIGURE 3A, the two D.C. voltages are of equal magnitude but opposite polarity. Therefore, when they are summed through equal high resistances R26 and R27, the resultant voltage, which is fed back on the transmission line, is in the null condition. This situation is depicted in FIGURE 4, which shows the familiar locus of output voltage as a function of frequency for a frequency discriminator circuit. FIGURE 4 shows that a negative voltage will be fed back on the transmission line whenever the applied frequency is above resonance of the tuned circuit in the network and a positive voltage whenever the applied frequency is below that of the tuned circuit frequency.

Through feeding back the discriminator output voltage onto the transmission line, it is possible to sense the resonant frequency of the tuned circuit in the network from the readout station with high precision. Thus, if the phenomena to be measured is arranged to alter either the inductance value L19 or the capacitance value C20, that effect can be readily detected and measured by applying a variable frequency to the transmission line and adjusting same until the D.C. voltage coming back on the line reaches its null position.

One of the principal advantages of this method of remote sensing lies in the fact that detection of the null is not significantly dependent upon signal amplitude, the effect of drive signal amplitude being only to change the slope of the detector characteristic shown in FIGURE 4.

The use of a tracking oscillator in conjunction with the resonance bridge sensory element described hereinabove in connection with FIGURES 1 to 4, can best be understood with reference to the block diagram, FIGURE 5, wherein 31 is an oscillator designed to be tunable throughout a given range of frequencies by means of the frequency control circuit 32. Buffer amplifier 33 serves to isolate oscillator 31 from the two power output amplifiers 34 and 35. Amplifier 34 serves to strengthen the oscillator amplitude for transmission through line 36 to a transducer utilizing the resonance bridge as its sensory element. The resonance bridge circuit described hereinabove serves as a pure resistance termination for signals traveling on transmission line 36 and which serve as excitation for the resonance bridge circuit.

The resonance bridge, furthermore, returns a D.C. signal on transmission line 36, the magnitude and polarity of which is determined by the relative position of the excitation signal coming from oscillator 31 with respect to the tuned frequency of the resonant circuit within the bridge, as defined by the following:

(1) When the exciting frequency is below the resonant frequency in the bridge, the voltage returned on the line is positive.

(2) When the exciting frequency is above the resonant frequency in the bridge, a negative voltage is returned on the line.

(3) A voltage null is returned on the line as the exciting frequency comes into coincidence with the resonant circuit in the bridge.

Thus, whenever an error exists between the alignment of the exciting oscillator frequency with that of the tuned frequency in the resonance bridge, an error voltage is present on transmission line 36. This error voltage is delivered to integrating amplifier 39 through low-pass filter 38, which serves to separate the error voltage from the excitation signal entering transmission line 36.

Integrator amplifier 39 develops an output voltage affecting frequency control circuit 32 so as to bring the oscillator frequency into coincidence with the resonant frequency of the tuned circuit in the resonance bridge, thus nulling the error voltage after a fashion commonly practiced in servo control circuits.

Thus, as transducer 37 is exercised throughout its range of operation, the automatic frequency control servo loop described above maintains oscillator 31 in step with the adjustable tuned circuit in the transducer.

A permanent relationship between transducer setting and oscillator frequency can thus be reliably determined.

Digital readout from this system is achieved by sampling the oscillator 31 frequency via output amplifier 35 with use of a digital frequency meter 40, having a visible display as well as electrical signal output circuits if required.

Standard commercial digital frequency meters such as the Hewlett Packard model 524, or equivalent, can be used for readout of the tracking oscillator described herein.

Analog readout of the tracking oscillator frequency is readily accomplished with use of a standard frequency discriminator or detector 41, any number having already been described in the technical literature. Continuous analog display of tracking oscillator frequency would normally be furnished through use of a standard D.C. voltmeter 42 or an analog chart recorder.

The logical circuit elements involved in the tracking oscillator system described in FIGURE 5 are shown in block form. The individual circuits indicated might be constructed either of vacuum tube or solid-state electronic components or combination thereof, and all of the blocks indicated in FIGURE 5 contain circuits familiar to anyone skilled in the art. As an example of such a circuit, reference is made to FIGURE 6, wherein 43 is a transistor arranged to serve as the principal element of the variable frequency oscillator indicated in block 31 of FIGURE 5. The oscillation frequency of transistor 43 is determined by the tuned circuit comprising inductance 44 and capacitance 46. Paralleling the tuned circuit is reactance control tube 47, which is set up in the familiar reactance control circuit, wherein the current drawn by the plate of tube 47 is arranged to lead the RF voltage applied to said plate, thus causing the tube to appear as variable capacitor adjustable by the control grid voltage supplied by integrator amplifier 48.

Integrator amplifier 48 might consist of any standard high-gain operational amplifier, such as is commonly used in analog computers. A Philbrick Researches, Inc. model P-2 is a good example. The amplifier is made into an integrator with use of capacitor 49 and resistor 51. Any error voltage that might exist on the output of the discriminator circuit 37 as fed back through transmission line 36 and low-pass filter 38 (comprising capacitor 52 and inductor 53) will be integrated with respect to time until a voltage is developed upon grid 54 of tube 47, which is the correct amount to bring the effective capacitance introduced by the control circuit to a value that will adjust the frequency of oscillator 43 to match the resonant frequency of the tuned circuit in the bridge, thereby nulling the error voltage and terminating the integration.

It will be understood that in the brief example given in FIGURE 6 of a practical tracking oscillator circuit, the output amplifier circuits 34 and 35 have been omitted, and buffer amplifier 33 is indicated as supplying excitation to the resonance bridge in 37, via transmission line 36.

It will be seen that the tracking oscillator is capable of generating the A.C. excitation signal for the resonance bridge sensor circuit through a substantial length of transmission line, is capable of sensing the return signal from the resonance bridge circuit terminating the transmission line, and is capable of utilizing this return signal as a control over the frequency of the oscillator, thereby causing the oscillator to accurately track or follow the resonant frequency of the inductance-capacitance circuit employed in the sensory resonance bridge. The tracking oscillator is capable of being read out in digital form so that the combination of the resonance bridge sensing circuit with the tracking oscillator and a digital readout instrument such as a frequency meter or counter becomes a digital sensory system for remote measurements. Furthermore, the tracking oscillator is capable of being read out on an analog basis to provide an electric current or voltage whose magnitude and polarity are representative of a remote variable under measurement. Thus a general purpose remote sensing instrument employing both features of digital and analog readout capability has been provided.

A completely different alternative method of sensing the resonance frequency of a resonance bridge circuit remotely will now be described. In particular, this alternative method has the following objectives:

(1) To provide a sweep frequency signal source capable of exciting a resonance bridge circuit through a transmission line of substantial length.

(2) To provide a signal source as above, incorporating a frequency selective network capable of separating a signal applied to the transmission line terminated by the resonance bridge from the signal returned by the resonance bridge.

(3) Equipment as above, providing the further facility of locating the resonance frequency in a resonance bridge with respect to a fame of reference in the frequency domain.

(4) Equipment as above, providing a means of digital display and recordable signal output of the measured position of resonance.

The use of a sweeping oscillator in combination with the resonance bridge sensory element described hereinabove with reference to FIGURES 1 to 4, can best be understood with respect to a series of charts, as shown in FIGURE 7, wherein FIGURE 7a shows the operating range of a typical resonance bridge type transducer element. In the example used here, the resonance bridge is seen to operate throughout a range of frequencies extending from slightly below ten megacycles to slightly above 11½ megacycles.

The sawtooth relationship between the frequency of an exciting oscillator and time is shown in FIGURE 7b. This relationship is intended to be substantially a linear one. However, as will be shown later, the accuracy of the readout system contemplated herein is not determined by or limited to the accuracy with which a linear relationship between frequency and time can be established.

FIGURE 7c shows the position of a fixed reference frequency of ten megacycles in the frequency domain.

FIGURE 7d illustrates the modulation spectrum that would be generated around reference frequency F1 by allowing it to be amplitude-modulated by a dissymmetrical square wave signal $F_0$ of 100 cycles. Each modulation sideband is precisely positioned $F_0$ cycles per second away from every other sideband.

FIGURE 7e illustrates the type of voltage waveform as a function of time that would be recovered from a resonance bridge excited by the sweeping oscillator when said resonance bridge is tuned to a frequency near the upper end of the operating range.

FIGURE 7f shows a series of pulses positioned in time where the sweeping oscillator would pass through zero beat with each one of the modulation sidebands of FIGURE 7d, as it sweeps across the operating range. Only those zero beats lying between the fixed reference frequency F1 and the actual position of the resonance bridge, F3, are shown, as it is the intent of this invention to utilize these pulses corresponding to the zero beats as a measure of the position of the resonance frequency by counting the pulses each sweep and displaying this number.

By utilizing the modulation spectrum of F1 as a calibration grating against which the position of the resonance bridge frequency F3 is measured, no reliance is placed upon the linearity of the sweep frequency versus time function of FIGURE 7b. Furthermore, the exact frequency of the fixed reference frequency F1, as well as the modulation frequency, $F_0$, is immaterial as long as both of these frequencies are stable, a requirement that is very easily met with the use of a quartz crystal oscillator for F1 and a temperature-compensated tuning fork for the modulation frequency $F_0$.

Absolute frequency values are not important here as a transducer would be calibrated initially against the sweep frequency readout system and adjusted to operate between the lower and upper frequency limits F1 and F2 defining the full-scale range of the device.

Figure 8:
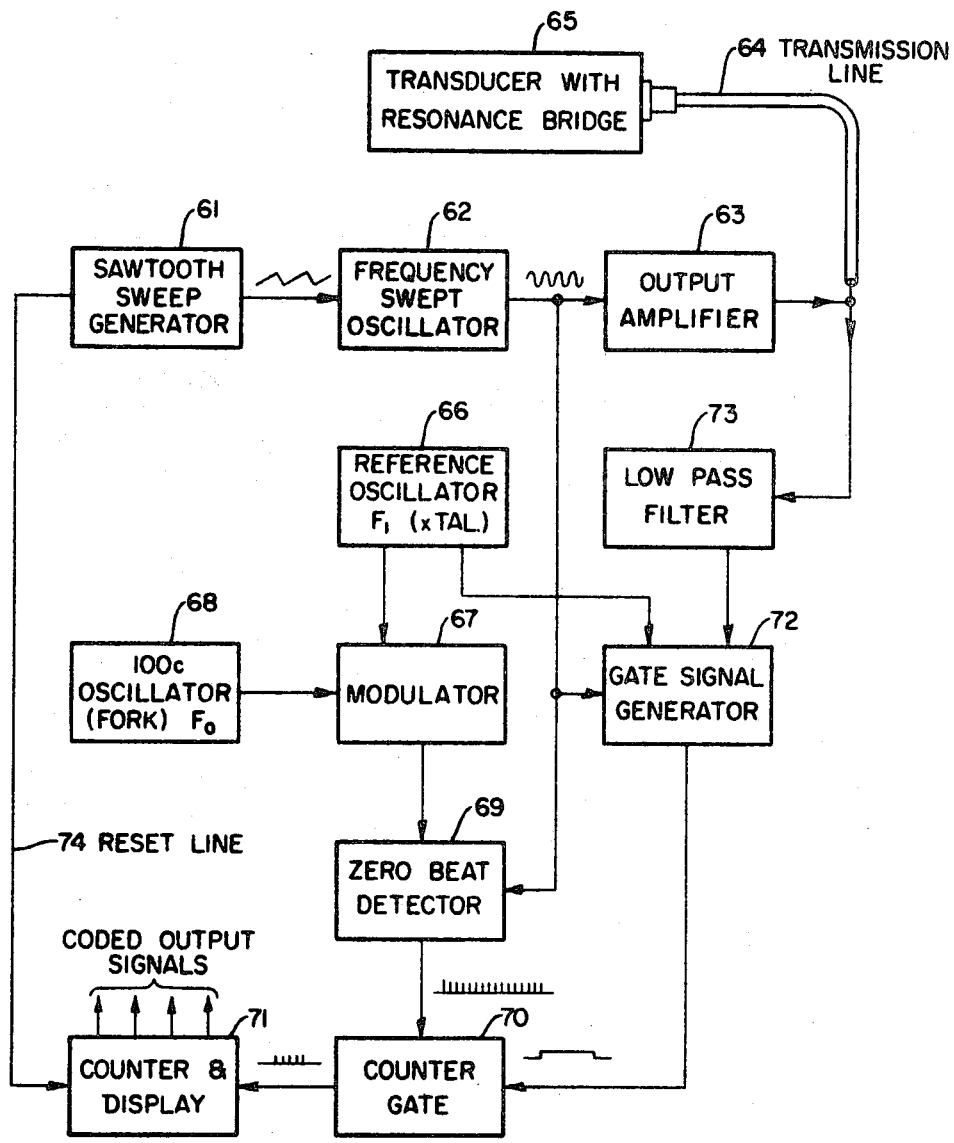
FIG. 8 is a block diagram schematically showing the relationship of the logical circuit elements included in a specific embodiment of the sweeping oscillator system of this invention.

Having described the contemplated method of sweep frequency readout for resonance bridge type transducers, the means for accomplishing the aforesaid readout can now be readily understood with reference to FIGURE 8, which is a block diagram showing various components of the system used to fulfill the logical operations outlined previously.

Each of the circuit elements described by blocks in FIGURE 8 are well established electronic circuits, well known to anyone familiar with the art. They may be constructed either of vacuum tube or solid state electronic components. The blocks are shown as in FIGURE 8 simply to illustrate the logical process involved in accomplishing the sweep frequency method of readout of resonance bridge type transducers in accordance with the concept of the present invention.

Referring to FIGURE 8, 61 is a sawtooth wave frequency generator which produces the waveform illustrated in FIGURE 7b. This is used to frequency-modulate the frequency-swept oscillator 62, the magnitude of which is then strengthened in output amplifier 63 prior to passing this excitation signal over transmission line 64 to the transducer 65. The stable reference frequency first introduced in FIGURE 7a is generated by crystal oscillator circuit 66.

A linear modulator 67 is used in conjunction with the 100-cycle tuning fork controlled oscillator 68, which is arranged to produce an asymmetrical square wave signal $F_0$, as modulation for the reference oscillator F1.

The swept frequency from oscillator 62 is introduced into the zero beat detector 69, where it is free to heterodyne with the modulation components produced in modulator 67 as it sweeps throughout the frequency range. The zero beat detector 69 features the capability of producing a definable mark, or pulse, in time as each zero beat condition is encountered. These are passed on to counter gate 70, which produces the burst of pulses shown in FIGURE 7f. This group of pulses is representative of the distance in time between signal frequency F1 and the resonance bridge frequency F3. The burst of pulses illustrated in FIGURE 7f when counted and displayed in counter register 71 provides a visible and recordable measure of the reading from transducer 65.

Counter gate 70 is opened so that the zero beat pulses can pass on to the counter 71 by means of a gating signal waveform developed in the gate signal generator 72 by allowing the coincidence of the swept oscillator frequency with reference frequency F1 to initiate the gating signal and the coincidence of the swept frequency with a signal coming back from the resonance bridge via low-pass filter 73 to terminate the gating signal.

At the beginning of each sweep from the sawtooth sweep generator, a signal is sent to the counter display 71 over reset line 74. This serves to reset the counter to zero at the start of each sweep, thus preparing it to receive the next succeeding burst of zero beat pulses. The reading of the transducer is, therefore, sampled once each sweep.

From the above description it will be seen that a sweep frequency signal source capable of exciting a resonance bridge circuit through a transmission line of substantial length has been provided. This signal source incorporates a frequency selective network capable of separating a signal applied to the transmission line terminated by the resonance bridge from the signal returned by the resonance bridge. This signal source also provides the further facility of locating the resonance frequency in a resonance bridge with respect to a frame of reference in the frequency domain. Furthermore, this signal source provides a means for digital display and recordable signal output of the measured position of resonance.

Obviously many modifications and variations can be made in the resonance bridge, or frequency discriminator, circuit and sensing system of this invention, by a person skilled in the art, in the light of the teachings given hereinabove. It is, therefore, to be understood that, within the scope of the appended claims, the invention can be practiced otherwise than as specifically described.

What is claimed is:

1. A resonant bridge circuit sensing and readout system comprising:
   a frequency discriminator circuit including a tuned circuit;
   a compensation circuit connected to the frequency discriminator circuit;
   a transmission line having two ends, one end being connected to the compensation circuit;
   said compensation circuit terminating said transmission line in a pure resistive load;
   a tracking oscillator tunable throughout a predetermined range of frequencies;
   a buffer amplifier circuit connected to the output of said tracking oscillator to isolate said oscillator from feedback through the oscillator's output;
   two power output amplifiers connected to the output of said buffer amplifier;
   a first one of said two power output amplifiers connected to the other end of said transmission line and serving to strengthen the oscillator amplitude for transmission through said transmission line to said compensator circuit and said frequency discriminator circuit;
   a low pass filter connected to a junction between the output of the first one of said two power output amplifiers and the other end of said transmission line to prevent the passage of a signal generated by said tracking oscillator and applied to said transmission line through said buffer amplifier and said first of said two power output amplifiers, and to pass signals originating at said frequency discriminator circuit;
   the signals originating at said frequency discriminator being proportional to the difference between the frequency of signals generated by said tracking oscillator and the resonant frequency of said tuned circuit of said frequency discriminator circuit;
   a frequency control circuit connected to said tracking oscillator for controlling the frequency of said tracking oscillator;
   an integrator amplifier circuit connected to the output of said low pass filter circuit and to the input of said frequency control circuit for providing an integrated amplified output of signals passed by said low pass filter circuit; and
   an indicator connected to the output of the second one of said two power amplifiers to produce readout from the system.

2. Apparatus as claimed in claim 1 wherein said indicator is a digital frequency meter for producing a digital readout.

3. Apparatus as claimed in claim 1 wherein said indicator is a frequency detector for producing an analog readout.

4. A resonant bridge circuit sensing and readout system comprising:
   a frequency discriminator circuit;
   a compensation circuit connected to the frequency discriminator circuit;
   a transmission line having two ends;
   said frequency discriminator circuit and compensation circuit being connected to one end of said transmission line;
   a frequency-swept oscillator;
   a saw tooth wave frequency generator connected to said frequency-swept oscillator to frequency-modulate the output of said frequency-swept oscillator;
   an amplifier with its input connected to the output of said frequency-swept oscillator and its output connected to the other end of said transmission line to pass the strengthened frequency oscillator signal to the frequency discriminator circuit;
   a reference oscillator circuit for generating a stable reference frequency;
   a tuning fork controlled oscillator for generating an asymmetrical square wave signal;
   a linear modulator connected to the output of said reference frequency oscillator circuit and to the output of said tuning fork oscillator whereby said tuning fork oscillator's square wave signal modulates the signal from said reference oscillator;
   a zero beat detector having one input connected to the output from said linear modulator and a second input connected to the output of said frequency-swept oscillator whereby the signal from said oscillator heterodynes with the output from said linear modulator as the frequency from said frequency-swept oscillator sweeps through its frequency range; a counter gate connected to the output of said zero beat detector for producing a definable burst of pulses as each zero gate condition occurs;
   a counter register connected to the output of said counter gate for producing a visible and recordable measure of the reading from said frequency discriminator circuit;

a low pass filter having its input connected to the other end of said transmission line;

and a gate signal generator having a first input connected to the output of said low pass filter, a second input connected to the output of said reference oscillator, and a third input connected to the output of said frequency-swept oscillator, the output from said gate signal generator connected to the input of said counter gate whereby the zero beat output starts the burst of pulses from the counter gate and a signal from the gate signal generator ends the burst of pulses.

5. A frequency discriminating resonant bridge circuit comprising:
a first terminal adapted for connection to a source of alternating frequency signals;
a second terminal;
a first resistor connected between said first and second terminals;
a first capacitor connected to said second terminal;
a third terminal;
a second resistor connected between said first and third terminals;
a second capacitor connected to said third terminal;
a fourth terminal;
a third resistor and a first diode connected in series between said second and said fourth terminals;
a fourth resistor and a second diode connected in series between said third and said fourth terminals;
a transformer having a primary and first, second and third secondary windings;
said primary winding connected to said first terminal;
said first secondary winding connected in parallel with said third resistor;
said second secondary winding connected in parallel with said fourth resistor;
a third capacitor;
and said third capacitor and said third secondary winding connected in parallel to said fourth terminal.

6. Apparatus as claimed in claim 5 including:
a capacitor connected between said first terminal and said primary winding;

7. Apparatus as claimed in claim 6 wherein:
said first and second secondary windings are tightly coupled to said primary winding and oppositely wound; and
said third winding is loosely coupled to said primary winding.

8. Apparatus as claimed in claim 7 wherein said diodes both have their anodes connected to said fourth terminal.

References Cited by the Examiner

UNITED STATES PATENTS 2,519,668 8/1950 Konigsberg _____ 324—61 X
2,774,959 12/1956 Edelman et al.

WALTER L. CARLSON, *Primary Examiner.*

RICHARD B. WILKINSON, *Examiner.*

P. F. WILLE, *Assistant Examiner.*